United States Patent
Belliveau et al.

(10) Patent No.: US 10,079,040 B2
(45) Date of Patent: Sep. 18, 2018

(54) SYSTEMS AND METHODS FOR VIDEO CLIP CREATION, CURATION, AND INTERACTION

(71) Applicant: Disney Enterprises, Inc., Burbank, CA (US)

(72) Inventors: Jody Belliveau, Burbank, CA (US); Edward Drake, Burbank, CA (US); Anthony Mutalipassi, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 345 days.

(21) Appl. No.: 14/189,908

(22) Filed: Feb. 25, 2014

(65) Prior Publication Data
US 2015/0185965 A1 Jul. 2, 2015

Related U.S. Application Data

(60) Provisional application No. 61/922,646, filed on Dec. 31, 2013.

(51) Int. Cl.
*G06F 3/048* (2013.01)
*G11B 27/031* (2006.01)
*G11B 27/00* (2006.01)

(52) U.S. Cl.
CPC .......... *G11B 27/031* (2013.01); *G11B 27/007* (2013.01)

(58) Field of Classification Search
CPC .................................................. G06F 3/0481
See application file for complete search history.

(56) References Cited

U.S. PATENT DOCUMENTS

| | | | |
|---|---|---|---|
| 6,597,375 B1 * | 7/2003 | Yawitz | G11B 27/034 715/723 |
| 7,624,337 B2 | 11/2009 | Sull et al. | |
| 8,001,143 B1 | 8/2011 | Gupta et al. | |
| 8,082,511 B2 | 12/2011 | Sobotka et al. | |
| 8,520,088 B2 | 8/2013 | Deever | |
| 8,769,576 B2 | 7/2014 | Burkitt et al. | |
| 8,831,403 B2 | 9/2014 | Patil et al. | |
| 8,832,732 B2 | 9/2014 | Fano et al. | |

(Continued)

FOREIGN PATENT DOCUMENTS

WO 2014004471 1/2014

OTHER PUBLICATIONS

FinalCutPro—10.0.6, Apple, Oct. 23, 2012.*
(Continued)

*Primary Examiner* — Jeffrey A Gaffin
*Assistant Examiner* — Mohamed Abou El Seoud
(74) *Attorney, Agent, or Firm* — Sheppard Mullin Richter & Hampton

(57) ABSTRACT

Disclosed are systems and methods for user interaction with and curation of digital media content, such that users are able to specify a particular clip of video content, and utilize the clip in a desired way. The disclosed systems and methods allow users to view video content, select video clips within the video content, save video clips into a collection of video clips, and curate the collection of video clips. The disclosed systems and methods also allow users to view bookmarks indicating the positions of saved video clips within video content, and to interact with video clips within a video player.

36 Claims, 12 Drawing Sheets

(56) References Cited

U.S. PATENT DOCUMENTS

| | | |
|---|---|---|
| 2005/0028194 A1 | 2/2005 | Elenbaas et al. |
| 2007/0088844 A1 | 4/2007 | Seims |
| 2007/0154190 A1 | 7/2007 | Gilley et al. |
| 2008/0154889 A1 | 6/2008 | Pfeiffer |
| 2009/0287989 A1 | 11/2009 | Chakra et al. |
| 2010/0153848 A1 | 6/2010 | Saha |
| 2010/0199295 A1* | 8/2010 | Katpelly ............... H04L 67/306 725/14 |
| 2010/0242074 A1 | 9/2010 | Rouse et al. |
| 2011/0197130 A1 | 8/2011 | Holt |
| 2012/0033949 A1 | 2/2012 | Lu et al. |
| 2012/0123780 A1 | 5/2012 | Gao et al. |
| 2012/0237183 A1 | 9/2012 | Chen et al. |
| 2012/0242900 A1 | 9/2012 | Huang et al. |
| 2012/0263430 A1 | 10/2012 | Spitzer-Williams |
| 2012/0284623 A1 | 11/2012 | Soderstrom |
| 2013/0166652 A1 | 6/2013 | Conway et al. |
| 2013/0325869 A1 | 12/2013 | Reiley et al. |
| 2014/0186004 A1 | 7/2014 | Hamer |
| 2015/0193465 A1* | 7/2015 | Schoeffler ......... G06F 17/30194 707/827 |

OTHER PUBLICATIONS

MatrixWhiteRabbit, Oct. 14, 2005.*
FinalCutPro—10.0.6_2,Apple, Oct. 23, 2012.*
FinalCutPro—10.0.6_3, Apple, Oct. 23, 2012.*
Teng, Looping a scene from a DVD using A-B Repeat, 2009.*
Icejd7,How to trim video in Mac using Quicktime, Apr. 15, 2011, YouTube, https://www.youtube.com/watch?v=Cte9-PyQMzY.*
Song, Guanghan. Effect of sound in videos on gaze: Contribution to audio-visual saliency modeling. Image Processing. Universite de Grenoble, 2013. English.

* cited by examiner

SYSTEMS AND METHODS FOR VIDEO CLIP CREATION, CURATION, AND INTERACTION

CROSS-REFERENCE TO RELATED APPLICATIONS

This application claims the benefit of U.S. Provisional Application No. 61/922,646, filed Dec. 31, 2013, which is incorporated herein by reference as if fully set forth herein.

TECHNICAL FIELD

The present disclosure relates generally to digital media, and more particularly to systems and methods for individual user, aggregate user, or company curation of video clips.

SUMMARY OF THE INVENTION

The present disclosure may be embodied in a method comprising receiving an original video content; presenting a video clip interface for a user to create a video clip from the original video content; receiving a start point from a user; receiving an end point from a user, the start point, end point, and original video content defining a video clip; and saving the video clip for later playback by a user.

In a particular aspect, the method may further comprise receiving a command to remove a video clip from the original video content, and playing the original video content with one or more video clips removed from the original video content.

In another aspect, the method may further comprise playing the original video content and presenting a bookmark during playing of the original video content, the bookmark corresponding to the video clip. The bookmark may correspond to a star and end point of the video clip. In a further aspect of this embodiment, a video clip interaction option may be presented when playing of the original video content approaches the bookmark. The video clip interaction option may be a looping option, and the method may further comprise receiving a command to loop the video clip via the video clip interaction option and playing the video clip on a repeating loop.

In yet another aspect, saving the video clip may comprise saving the video clip to a collection of video clips, and the method may further comprise sorting the collection of video clips according to a pre-determined criteria. In one aspect of this embodiment, the method may further comprise receiving an information tag from a user to create a pre-determined criteria on which the collection of video clips may be sorted.

In one aspect, the original video content may be video content that is owned by the user.

In another aspect, receiving a start point and an end point from a user may further comprise providing assistance to the user in selecting a start point and an end point. Providing assistance to the user in selecting a start point and an end point may be based on one or more quality factors to determine a fitness of a particular frame to act as a start point or an end point. The method may further comprise receiving a user command indicating which of the one or more quality factors are to be considered in providing assistance to the user in selecting a start point and an end point. At least one or more of the quality factors may be based on at least one or more of the following: dialogue, image quality, frame audio content, and/or frame image content. It may be the case that a portion of the video content cannot be selected as a start point or an end point.

The present disclosure may also be embodiment in a second method comprising receiving an original video content to be played by a media player; receiving video clip information identifying one or more video clips within the original video content; and presenting a video player interface comprising a primary viewing area in which the original video content is played, and one or more video clip indicators which are associated with one or more video clips and provide a visual indication of the position of the one or more video clips within the original video content. The original video content may be video content that is owned by a user.

The video player interface may further comprise a video progress indicator which provides a visual indication of the progress of the original video content as it is played, and the one or more video clip indicators may be positioned along the video progress indicator so as to provide a visual indication of the position of the one or more video clips within the original video content. The method may further comprise displaying a video clip interaction option when the progress of the original video content approaches any of the one or more video clip indicators.

The video clip interaction option may be a looping option, and the method may further comprise receiving a command to loop the video clip, and playing the video clip associated with the video clip indicator which caused display of the video clip interaction option on a repeating loop.

In a further aspect of this embodiment, receiving video clip information identifying one or more video clips within the original video content may comprise receiving one or more video clip suggestions. The one or more video clip suggestions may be based on video clips selected by other users.

The present disclosure may also be embodied in computer readable media comprising an instruction set configured to command a computing device to carry out the methods described herein.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

The disclosure provided herein describes systems and methods for user curation of digital media content.

Video content is a common medium by which entertainment or stories are presented to viewers. Viewers of video content often have favorite scenes or clips from the video content that they may want to view repeatedly or pull up easily without having to navigate through other portions of the video content. For example, children may have favorite scenes or songs in a video that they want to watch repeatedly, and parents may grow tired of constantly rewinding the particular scene that their children want to watch. The disclosed systems, methods, and features address these issues, as well as providing other related advantages.

The present disclosure provides for systems and methods for user interaction with and curation of digital media content, such that users are able to specify a particular clip of video content, and utilize the clip in a desired way. A user-specified video clip may be called a "Snippet"™ in this application and shown in the Figures. For example, a user may be able to repeatedly play the selected video clip in a loop, or the user may be able to save the selected clip into a playlist of favorite scenes, or the user may be able to remove a disfavored selected clip so that the video content plays without the removed clip. In a particular embodiment, the user may be able to manipulate media content owned by the user so as to customize the user's viewing experience of the media that they own.

Figure 1:
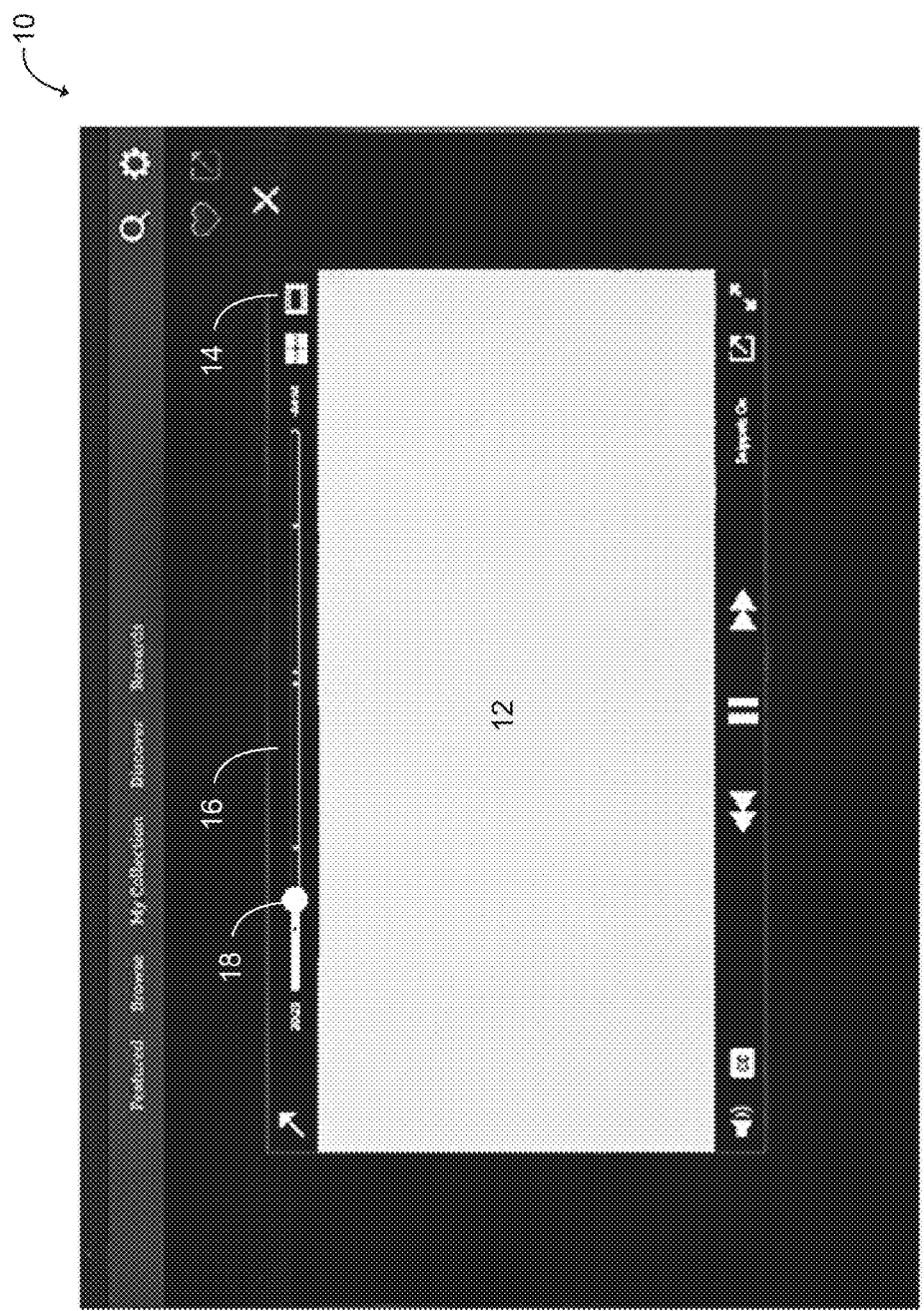
FIG. 1 is an example clip curation interface in accordance with an embodiment of the present disclosure.

FIG. 1 provides a screenshot of a sample video interface 10, in accordance with an embodiment of the present disclosure. The video interface 10 comprises a primary viewing area 12 on which video content is played, and a timeline 16 to indicate the progress of the video content via the positioning of a scrubber 18. The scrubber 18 may be selectable by a user so that the user can move the scrubber left or right to move to different time positions within the video content. The interface 10 also comprises a clip icon 14 to activate a clip interaction mode. When a user selects the clip icon 14, the interface 10 opens a clip interaction mode, in which the user can select and interact with a video clip from the video content.

Figure 2:
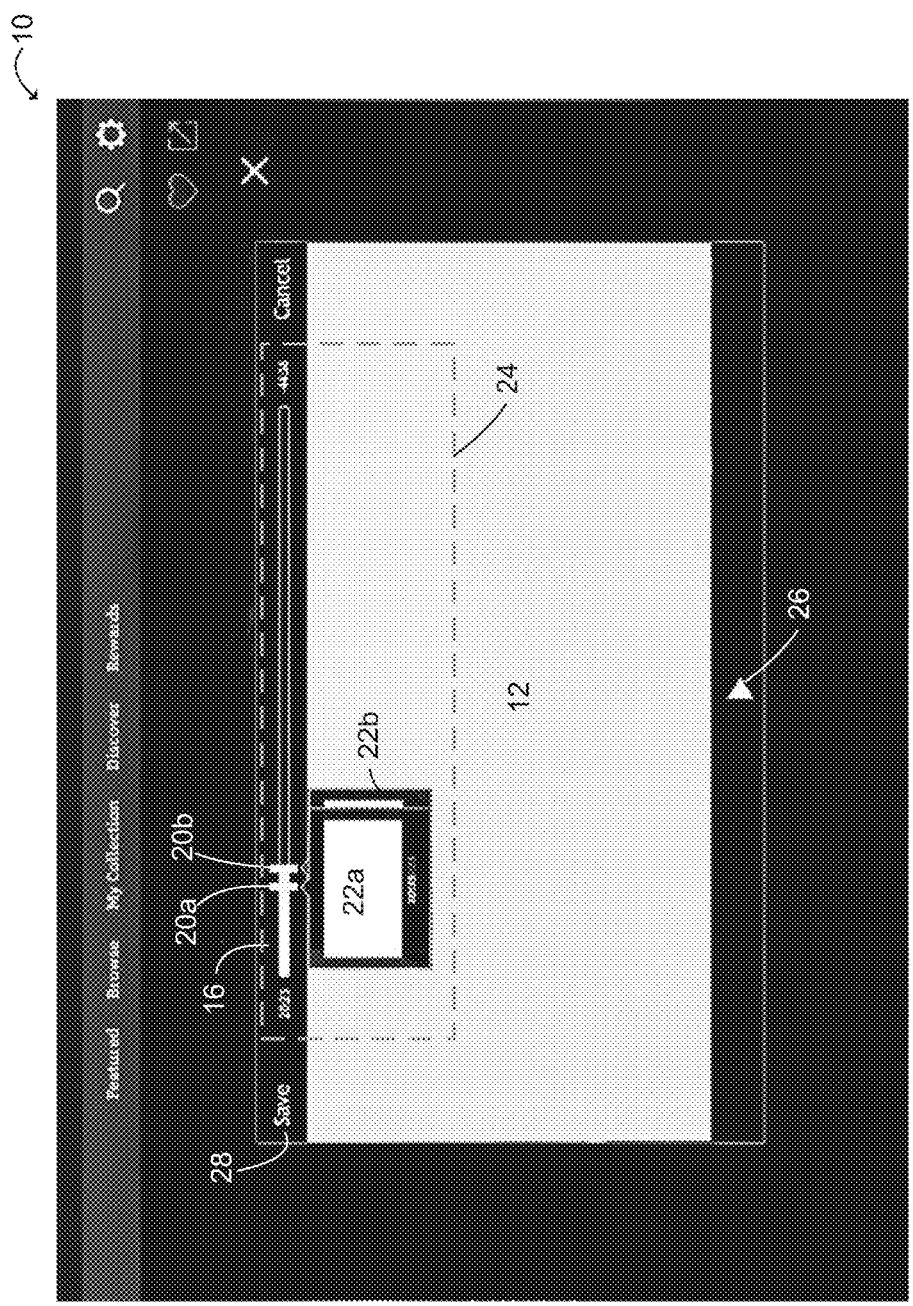
FIG. 2 is the clip curation interface of FIG. 1, in which the clip curation mode has been activated.

In FIG. 2, the user has selected the clip icon 14 in FIG. 1 to activate the clip interaction mode. In the clip interaction mode, the timeline scrubber 18 has been replaced by two clip scrubbers 20a, 20b. The clip scrubbers 20a, 20b are selectable by a user and determine the start point (start scrubber 20a) and end point (end scrubber 20b) of the clip that the user wishes to select. The area between the start scrubber 20a and the end scrubber 20b defines a selected clip region. Two clip windows 22a, 22b are also presented within the clip interaction mode. A first clip window 22a shows an image corresponding to the position of the start scrubber 20a, and a second clip window 22b shows an image corresponding to the position of the end scrubber 20b.

When the user selects the clip icon 14 to activate the clip interaction mode, the interface 10 may automatically define an initial selected clip region by placing the start scrubber 20a at the location of the timeline scrubber 18, i.e., the current viewing position within the video content, and placing the end scrubber 20b at a pre-determined location beyond the start scrubber 20a. The pre-determined location may be a fixed duration of time after the start scrubber 20a, e.g., five-minutes after the start scrubber 20a. The pre-determined location may also be a pre-determined "end scene" location indicating a position at which a scene ends, or some other point at which it may be desirable to end a clip. The user can then move the clip scrubbers 20a, 20b to whatever position they desire to capture the desired video clip.

In a more particular embodiment, clips may be limited to a minimum and/or maximum length, e.g., five minutes, and the pre-determined end scrubber 20b location may be based on the maximum clip length. For example, in FIG. 2, the user selected the clip icon 14 at time position 20:23 in the video content. The start scrubber 20a is positioned at time position 20:23, and the end scrubber 20b is positioned to create a clip of a pre-determined length, i.e., five minutes after the start scrubber 20a. The user can then move the clip scrubbers 20a, 20b to whatever position they desire to capture the desired video clip. As the user moves the clip scrubbers 20a, 20b, the clip windows 22a, 22b adjust accordingly so as to indicate the image at the selected time position in the video content. The user may also be able to adjust the position of the clip scrubbers 20a, 20b, by selecting and moving the clip windows 22a, 22b. The user may also be provided with an indication of the duration of the presently selected video clip. The user may also be able to lock a scrubber in place once the user has found a desired location.

The user may select the play icon 26 to play the currently selected clip. In a particular embodiment, selecting the play icon 26 may cause the currently selected clip to play repeatedly until the user performs some other action, such as saving the clip, canceling the operation, selecting a pause icon, or refining the clip by moving a clip scrubber 20a, 20b.

As can be seen in FIG. 2, it may be difficult for a user to manipulate the clip scrubbers 20a, 20b if the user wishes to capture a short clip if the video content is much longer than the desired clip length. As such, the interface 10 may further comprise a zooming in function such that the interface 10 will provide a zoomed in view of the selected clip area so that the user can manipulate the clip scrubbers 20a, 20b with greater precision. In one embodiment, the interface 10 may be configured such that if a user moves a selection cursor towards the clip scrubbers 20a, 20b, the interface 10 automatically zooms in on the selected clip region. In the depicted embodiment, when the user moves a selection cursor (e.g., a mouse pointer or touch screen pointer) into region 24, the interface will automatically zoom in.

Figure 3:
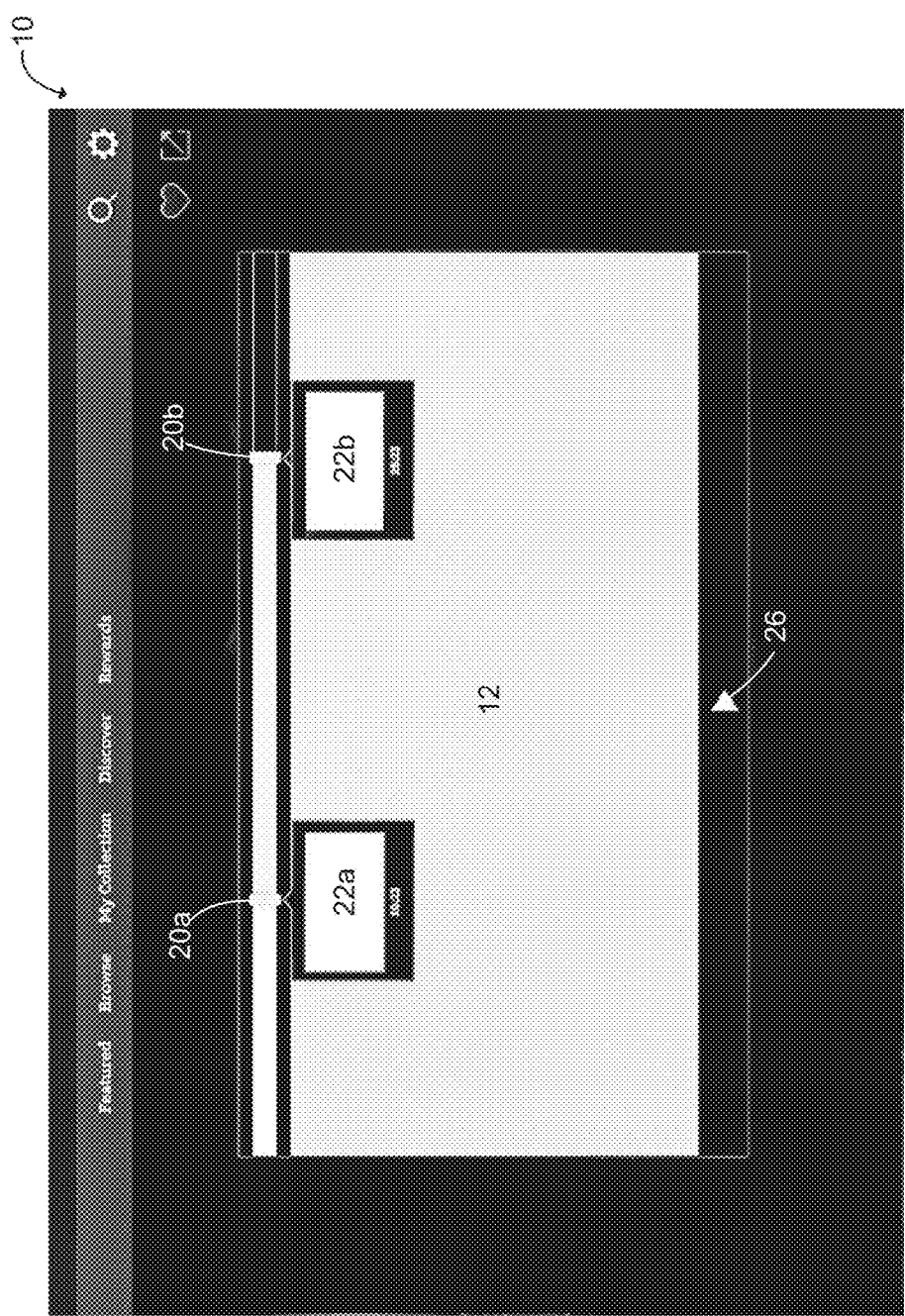
FIG. 3 demonstrates a zoom in feature of the clip curation mode of FIG. 2.

FIG. 3 shows the interface 10 after the interface has zoomed in on the selected clip region and the clip scrubbers 20a, 20b. Using this zoomed-in view, it becomes easier for the user to more precisely select the start and end points of the desired clip.

The video interaction interface 10 may, in certain embodiments, provide further assistance to the user in selecting a clip. For example, the interface 10 may include selection assistance such that each video clip has a desirable start or end point such that the clips do not start or end mid-word, or do not start or end on a blurry frame, or do not cut off any portion of a musical number, etc. This selection assistance or selection intelligence may be manipulated by the user so that the user can select which assistive aspects are applied, e.g., dialogue priority, or music priority, or scene priority, or visual sharpness priority. Further, these selection assistance characteristics may be applied by the video content producers so that the content producers are able to exhibit some level of control over users' ability to interact with the video content or to provide suggestions to users, e.g., clips that are popular among a population of users. For example, video producers may implement the requirement that video clips cannot start or end on a particular frame (e.g., because the frame is blurry, or because there are clearance problems with a particular frame, or because the frame is in the middle of a word of the dialogue). In this way, video content producers are able to control, to some degree, the quality of video clips created from their video content. For those aspects of selection assistance that are frame-dependent, particular frames or clusters of frames in the video content may be tagged by a video producer in a particular way to provide the selection assistance (e.g., a particular frame or set of frames may be tagged as an acceptable or unacceptable clip start or end). Additionally or alternatively, the video clip interface may include functionality to determine certain characteristics of the video content to assist in clip selection (e.g., detection of a completely dark scene indicates end or start of scene).

Figure 4:
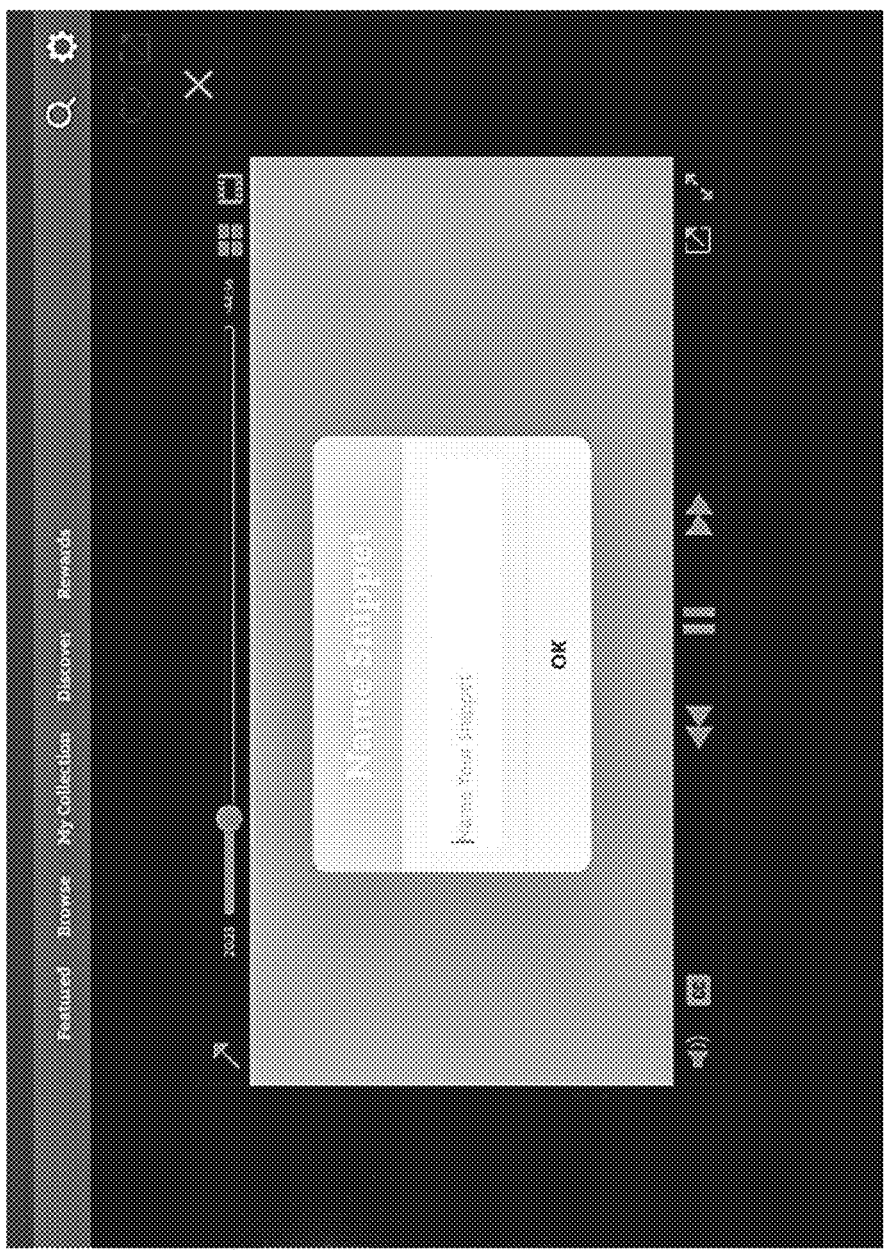
FIG. 4 demonstrates a clip naming window, in accordance with an aspect of the clip curation interface of FIG. 1.
Figure 5:
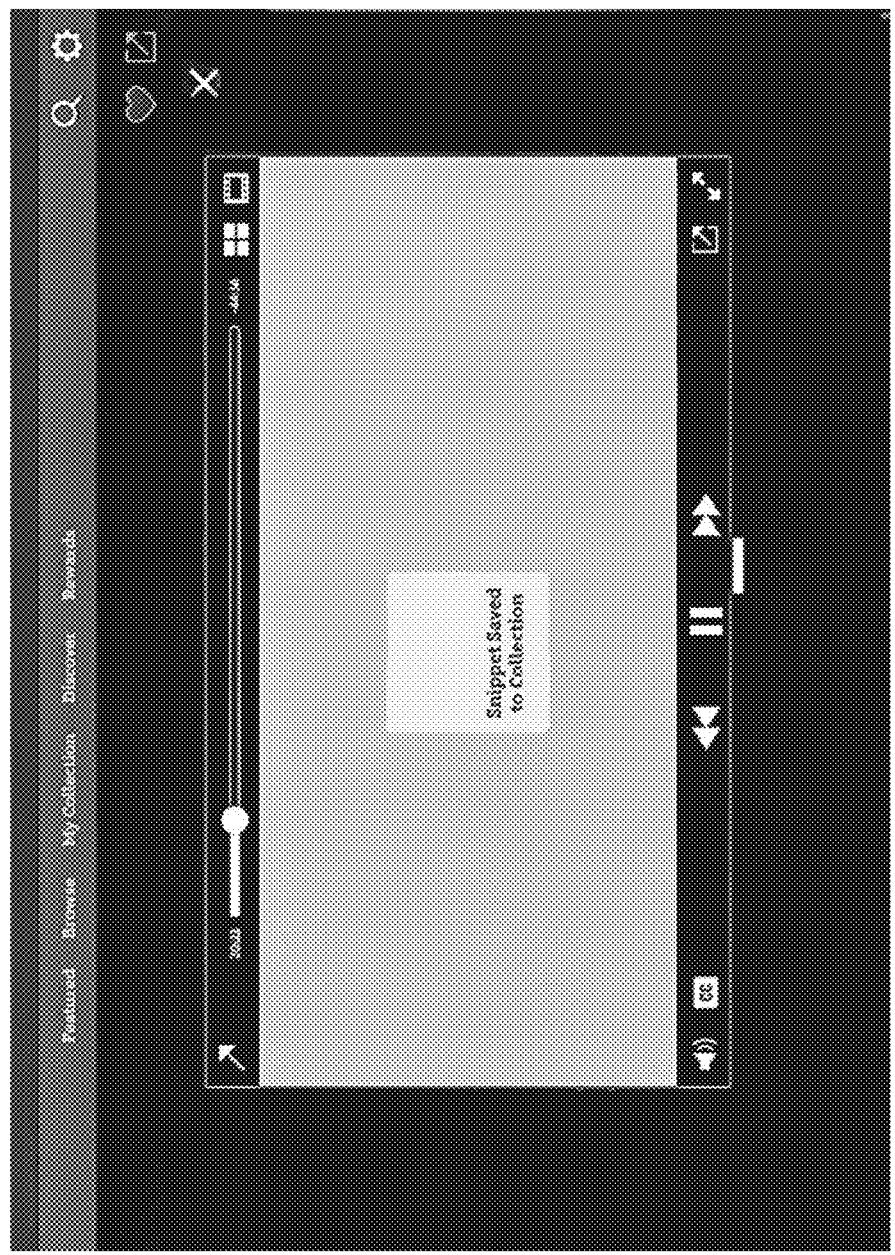
FIG. 5 demonstrates a save confirmation window, in accordance with an aspect of the clip curation interface of FIG. 1.

Once the user has selected their desired clip, they can choose to save the selected clip using a save icon 28 (shown in FIG. 2). Once the user selects the save icon 28, the user may be prompted to name the clip, as shown in FIG. 4. The user can choose to provide the clip with a specific name, or, a default clip name may be provided. The default clip name might include the title of the source video content, and/or an indication of the time position of the video clip within the original video content. Once the user successfully saves the clip, the user may be presented with an indication that the clip has been saved (FIG. 5).

The saved clip information may be stored locally on the user's video player, or remotely, e.g., on a remote data server. In one embodiment, video clips may be saved to a user's collection by simply taking time codes (a start point and an end point) and saving those time codes in the library and in the video stream itself. Alternatively, a video clip may be a separate, independent video file that is exported from the original video content based on the user's start time and end time selection. Exported video content may be transcoded to a different video format, or even a non-video format, such as a GIF file. Saved video clips may be associated with a particular user or a particular set of user credentials (e.g., username and password) such that a particular user can access their saved clips on any video player. Information relating to clips saved by a user may be shared over a network so as to provide data on which clips are being saved by users. This data may be used to provide useful information to video producers or other users, such as data indicating the popularity of certain video clips. This interactive aspect will be discussed in greater detail below.

Figure 6:
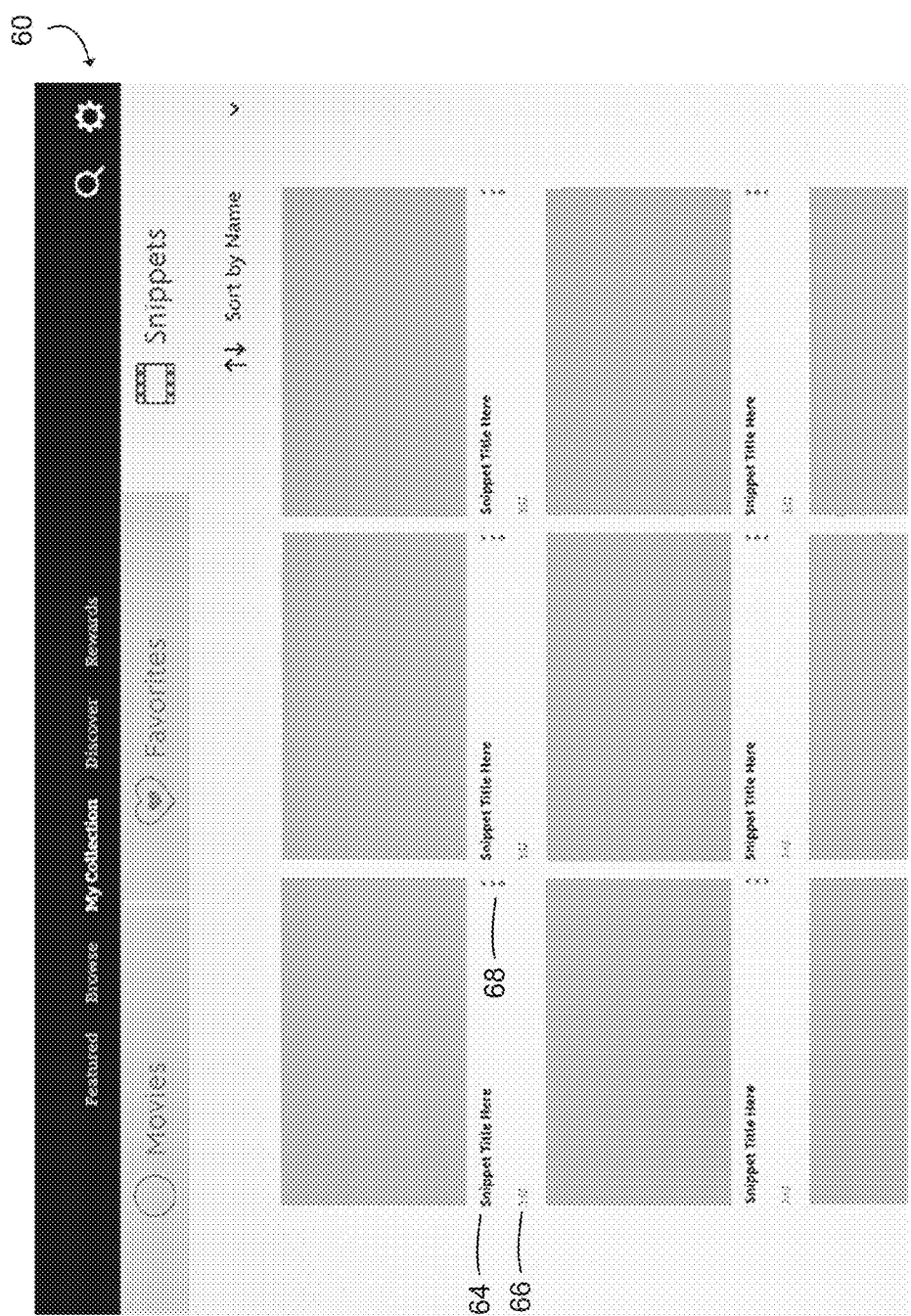
FIG. 6 demonstrates a video clip collection, in accordance with an embodiment of the present disclosure.

FIG. 6 illustrates a collection of saved video clips, in accordance with a further aspect of the present disclosure. When a user selects and saves a video clip, as demonstrated in FIGS. 1-5, the video clip may be automatically saved to a collection of video clips 60, shown in FIG. 6. This allows a user, a family, or a business team to make a personal collection of video clips 60. Each clip may include an image (not shown in FIG. 6) to indicate the content of the clip, a title 64, and a duration indicator 66. The title 64 may be automatically generated, or it may correspond to a clip name specified by a user. Similarly, each image may be automatically generated, or selected by the user. As discussed above with respect to assisting a user in selecting the start and end points for a video clip, selection assistance may be provided to assist a user in selecting a thumbnail image (e.g., preference for sharp frames over blurry frames) for a clip or to place certain restrictions on which images may be used as a thumbnail image (e.g., cannot be a black screen, or cannot be a screen with particular product advertising) for a clip. Each clip may further comprise an overflow icon 68 which provides the user with editing options for each clip. In a particular embodiment, video content may be delivered to the user with pre-selected and/or recommended video clips already populated into the user's clip collection.

Figure 7:
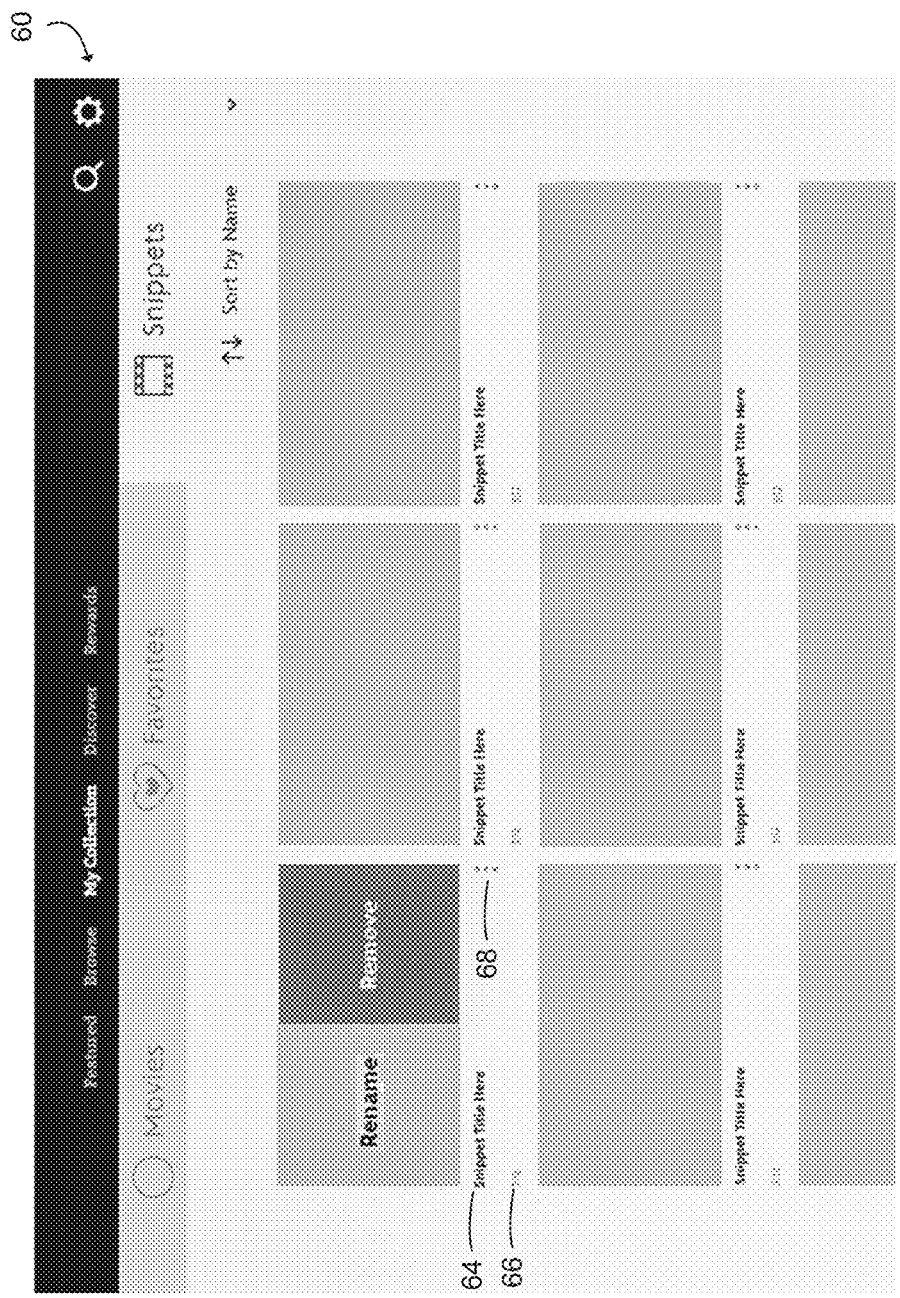
FIG. 7 demonstrates a clip editing feature of the video clip collection of FIG. 6.
Figure 8:
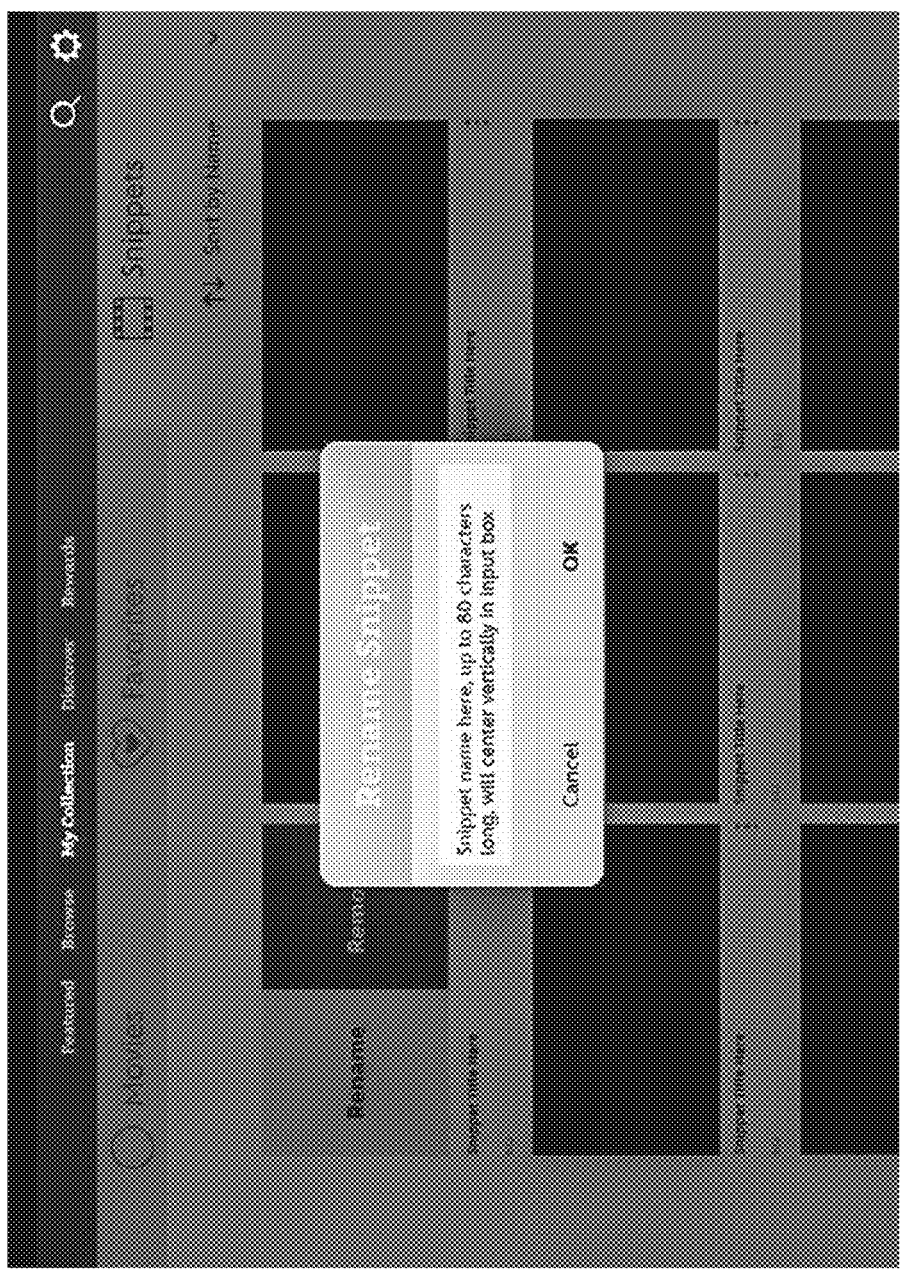
FIG. 8 demonstrates a clip renaming feature of the video clip collection of FIG. 6.
Figure 9:
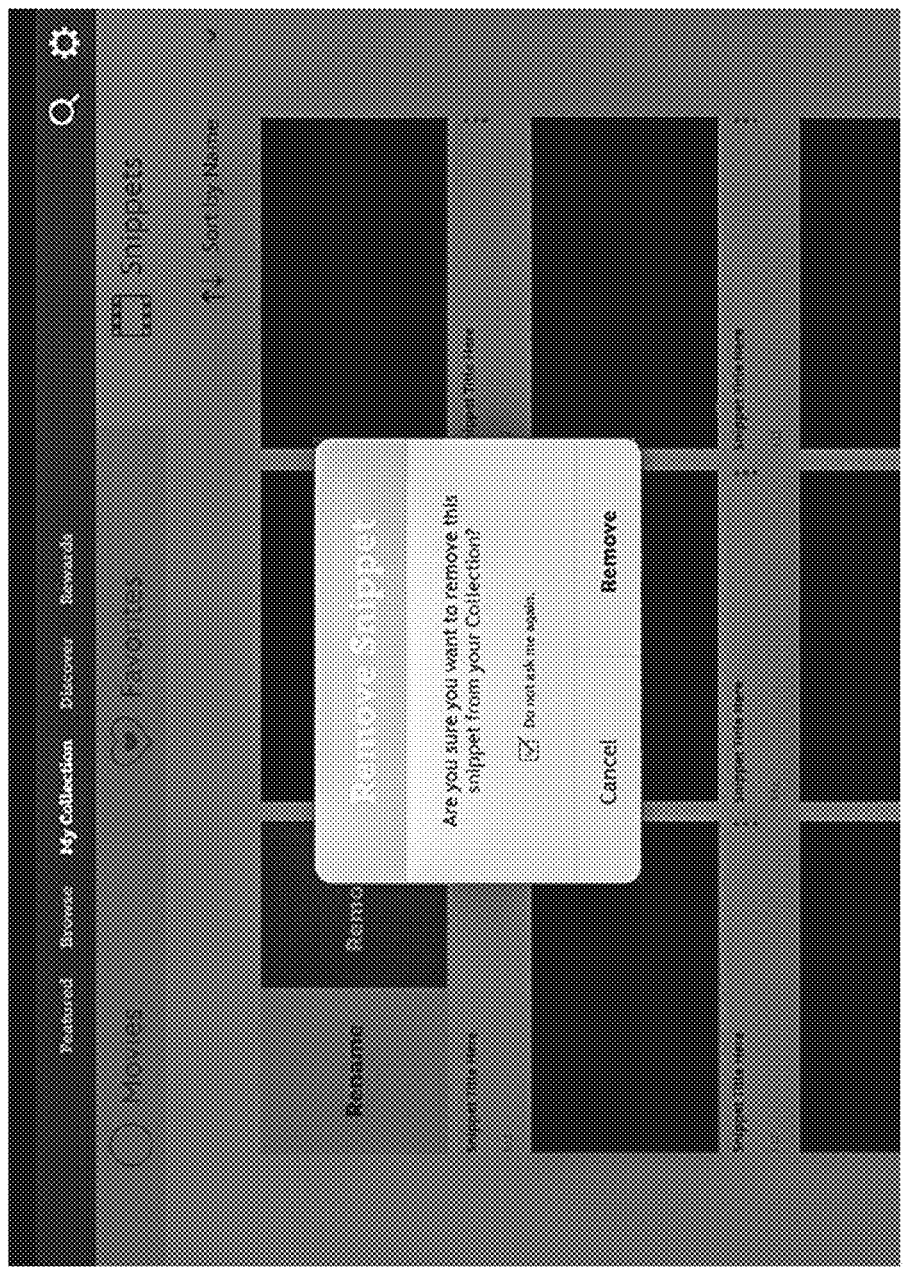
FIG. 9 demonstrates a clip removal feature of the video clip collection of FIG. 6.

FIG. 7 demonstrates a potential editing interface for editing a video clip. When the user selects the overflow icon 68 corresponding to the first video clip, the user is given the option to "Rename" or "Remove" the selected video clip. If the user selects the "Rename" option, the user is presented with a textbox to rename the video clip (FIG. 8). If the user selects the "Remove" option, the user may be provided with a confirmation to confirm that they wish to remove the selected video clip (FIG. 9). Alternatively, if the user re-selects the overflow icon 68, or clicks on another video clip, or performs some other navigation command, the edit mode will be canceled and the user can resume normal navigation of the collection 60. Within the collection, the user may select multiple video clips to create a playlist of video clips that can all be viewed consecutively, one after the other.

The user can also search or sort the saved video clips so that they are more easily navigated. The user may be able to tag video clips with certain information tags so that they are more easily sorted or searched. For example, a user may tag all action scenes with the tag "action" or may tag all scenes with a particular actor or actress with that actor or actress' name so that the collection can be searched or sorted based on actor or actress name. Clips may also be tagged with different users such that multiple users using a single account can distinguish their clips from other users, e.g., using the tag "Dylan's favorites" to differentiate from the tag "Jody's favorites." The user may also name the video clips in a particular way to make searching or sorting easier. Other examples of tags might include genres, themes, storylines, specific users (so that multiple users can tag their individual favorite scenes or preferences), clip types (e.g., favorite songs, jokes, images), characters, movies/the original video content, or any other organizational method that a user might want. Tagging categories may be pre-determined and provided to the user, or they may be customized by the user.

The present disclosure may further comprise an interactive aspect, such that video content providers and users are able to interact with one another to share video clips or data relating to video clips. For example, video content providers may receive information as to how users are interacting with their video content and which portions of the video content are being clipped. Using this information, video content providers may be able to suggest other video content containing similar clips. Further, when a user owns or purchases video content, the video content provider could use this data to suggest "popular clips" that other users frequently clip even pre-populate a list of clips into a user's collection. In addition to the popularity of a clip, clips may also be suggested to users based on a variety of other characteristics. Some examples might include geographic data, user demographic data (e.g., age and gender), data relating to viewing tendencies of a particular user (e.g., viewing history), the contents of a user's media collection, or any other information that may provide insight into a user's viewing preferences. Users can also interact with each other by sharing their clips and playlists for browsing by other users. In a particular embodiment, clips may be shared by exchanging video content data, start point data, and end point data. In an alternative and/or further embodiment, clips may be exported to create new, standalone video files of the clip itself.

Figure 10:
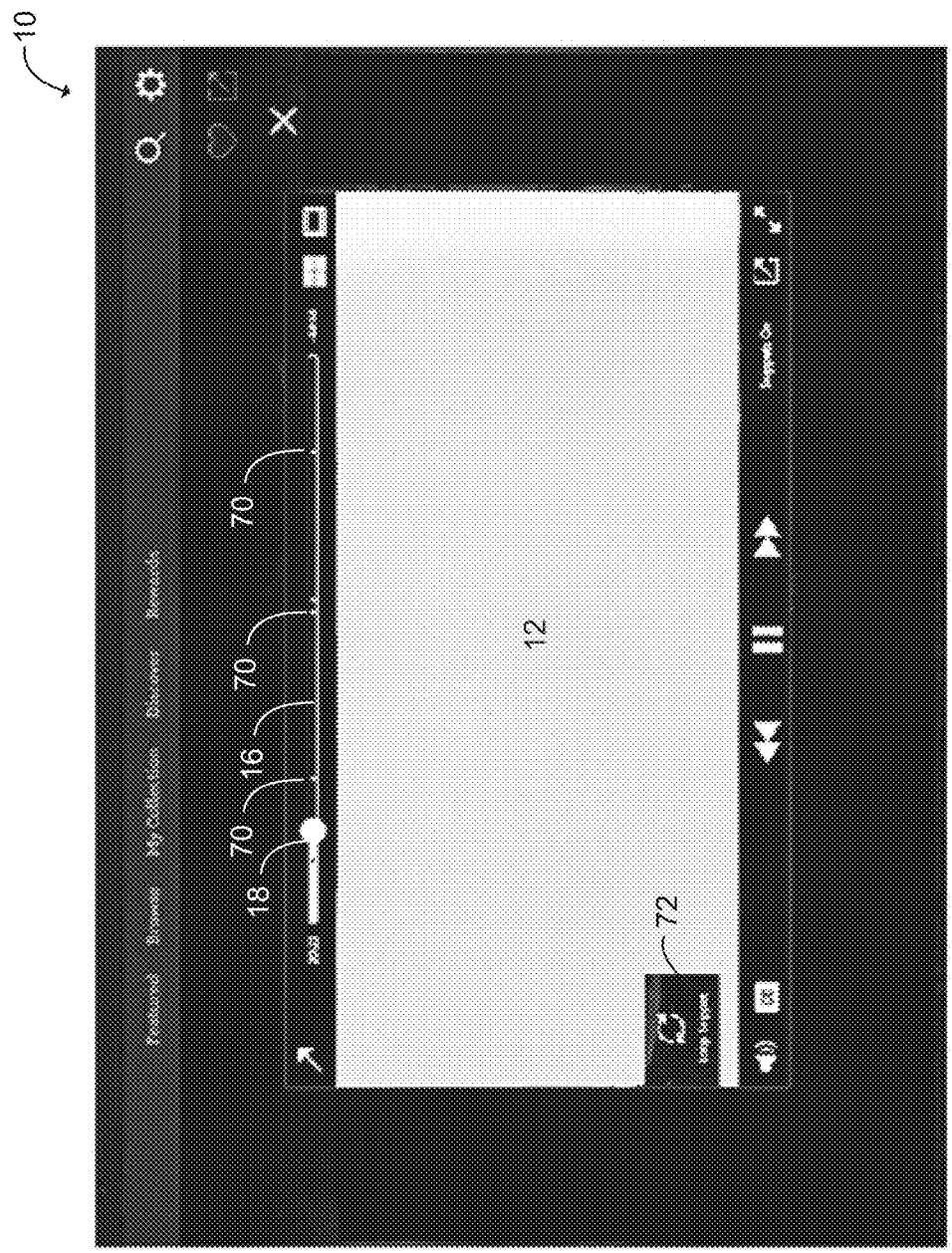
FIG. 10 demonstrates video clip bookmarking and looping features of the clip curation interface of FIG. 1.
Figure 11:
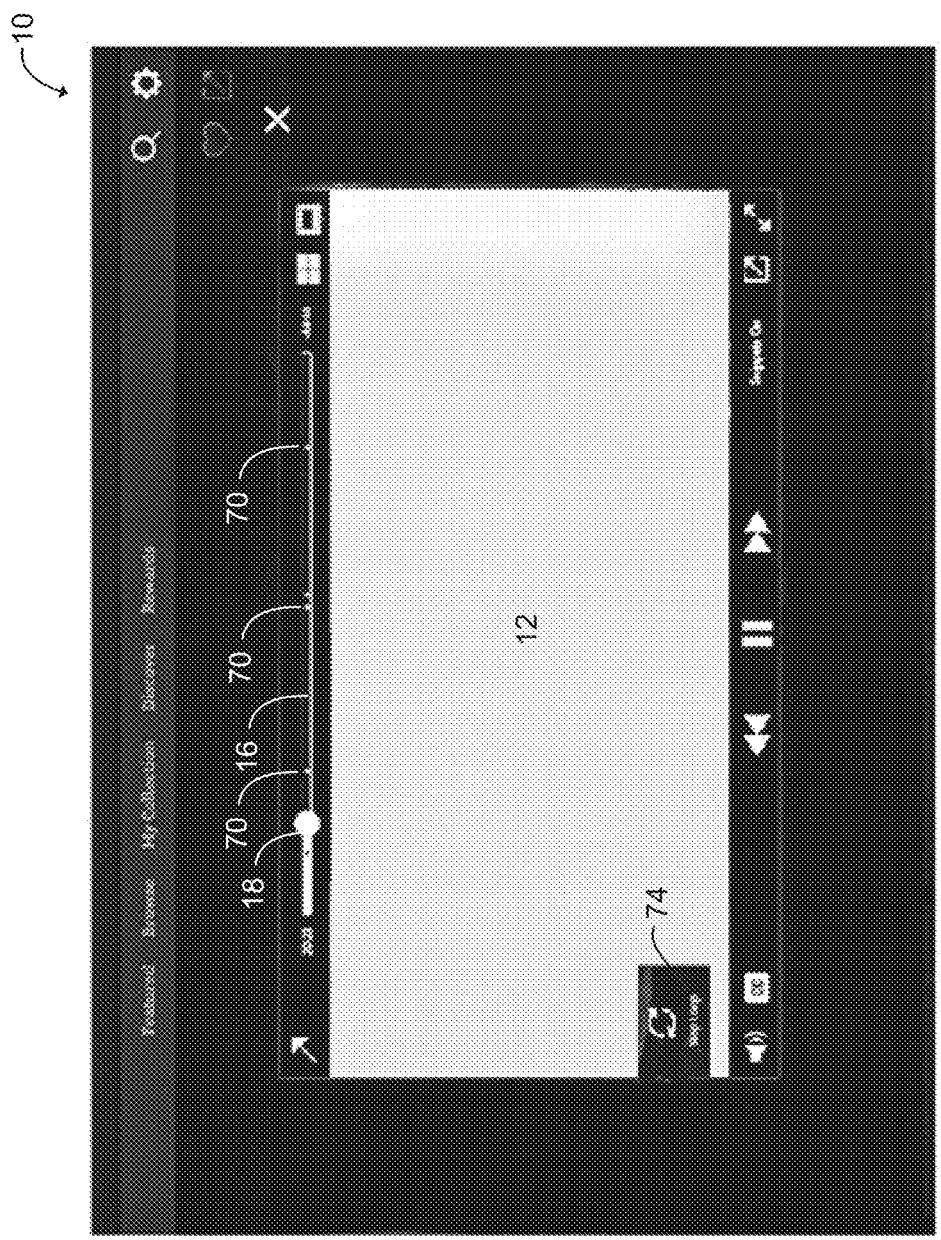
FIG. 11 demonstrates a stop loop feature of the clip curation interface of FIG. 1.

FIGS. 10 and 11 provide depictions of a further aspect of the present disclosure. Once a user has selected and saved clips to their collection, the interface 10 may automatically detect saved clips for a particular piece of video content, and create bookmarks at specific time positions within the video content corresponding to saved video clips. The user may then interact with the video clips in a variety of ways. The user may be presented with the option to turn bookmarks on or off.

In FIG. 10, bookmarks 70 along the timeline 16 indicate the presence of one or more previously saved video clips. As the user views the video content, the user may be provided with options to interact with the previously saved video clips. For example, in FIG. 10, the user is provided with an option to loop a video clip via a pop-up loop icon 72 (i.e., "Loop Snippet"). The pop-up loop icon 72 may appear on the user's screen when the played video content approaches a saved video clip, and then may disappear from the screen when the played video content moves past the saved video clip. In a particular embodiment, the pop-up loop icon 72 may stay on the screen for a pre-determined period of time before fading from view (e.g., the pop-up loop icon 72 may appear for seven seconds before fading from view). If the user selects the pop-up loop icon 72, the video clip that caused the appearance of the pop-up loop icon 72 will play on a continuous loop until a user command is provided to stop the loop.

In FIG. 11, the user has selected the pop-up loop icon 72, causing a video clip to play on a repeating loop. Now that the video clip is looping, the pop-up loop icon 72 transforms into a stop icon 74. The user can select the stop icon 74 to stop looping the video clip, and resume normal play of the video content. The stop icon 74 may be visible for as long as the video clip is looping, or it may appear when a user moves a cursor towards a certain position on the display, e.g., if the user moves their cursor towards the bottom left corner of the display, the stop icon 74 may appear.

The looping interaction described above is an example of one of many possible ways that user may interact using the video clip interface described herein. Another example might include creating revised versions of video content using the video clip function. For example, a collection of video clips may be combined together to create a revised version of the video content. Another example might include a "skip" function. The skip function might allow a user to skip from one saved clip to another (thereby "skipping" any non-clipped portions), or the skip function might allow a user to skip over a clipped portion and cause the video to resume playback at a point just after the clip.

In another example, selected video clips may be excluded from the video content to create a revised video content. Video content producers may use pre-populated video clips to create different versions of their content, such as a "child-friendly" version of a film that removes any scenes inappropriate for children.

As another example, a collection of all musical number clips or all action scenes could be aggregated into a single video clip.

As discussed above, video clips may be used to interact with video content while it is playing (e.g., by causing a particular clip to loop continuously). Clips may also be used interactively to share clips with other users or to share data that allows video content producers to provide a more personalized or otherwise improved user experience by using data personal to the user or aggregating data to make suggestions to other users. Video clips may also be exported into new data files that may be used in various ways. For example, clips may be exported into independent, standalone video, image, and/or audio files.

Where components or modules of the disclosed interface are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 12:
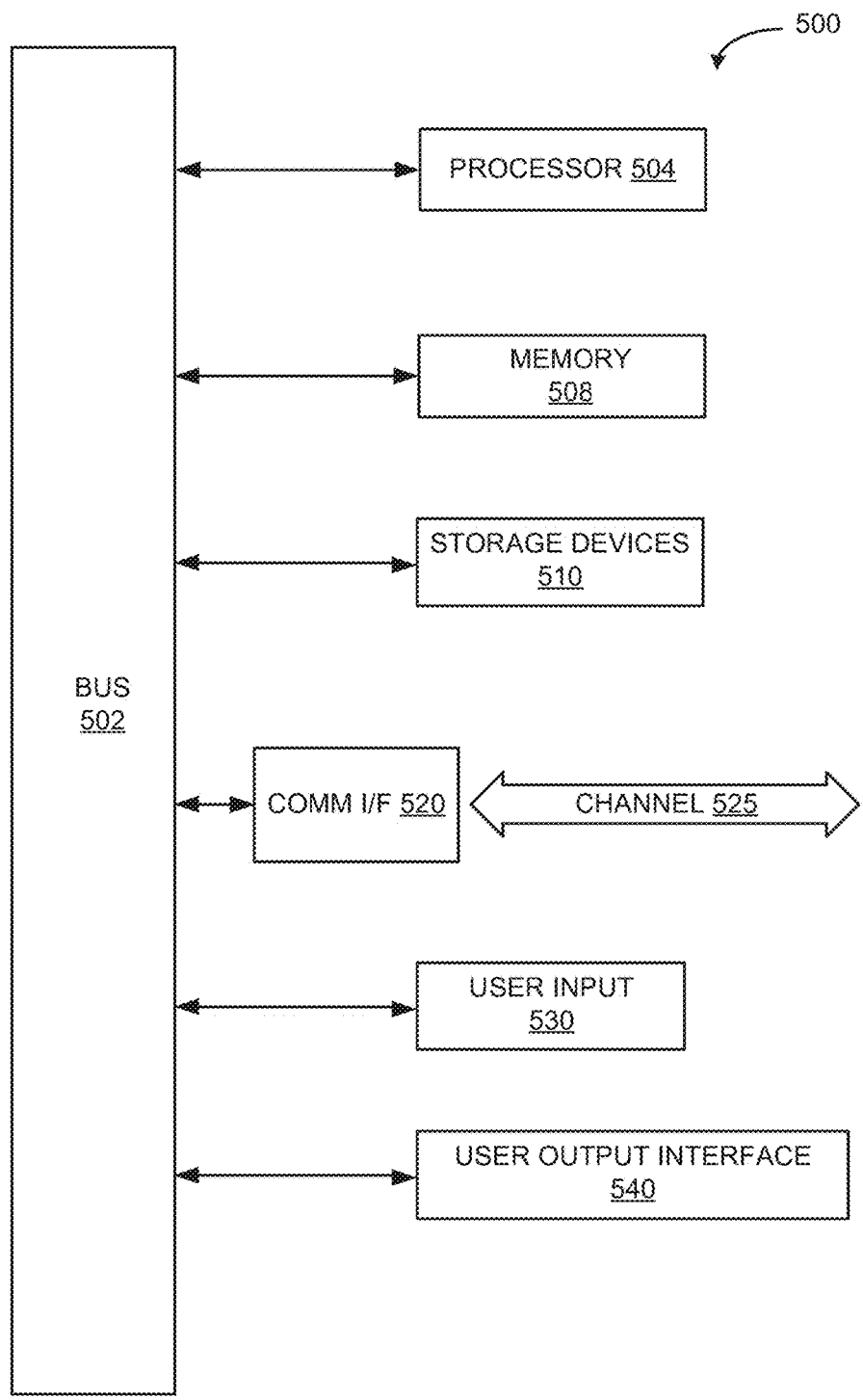
FIG. 12 illustrates a sample computing module that may be used to implement certain features and embodiments of the present disclosure.

Referring now to FIG. 12, computing module 500 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 500 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. Memory may include any non-transitory storage medium. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504. The computing module 500 might also include one or more various forms of information storage mechanism 510, which might include, for example, a magnetic tape drive, an optical disc drive, a solid state drive, or any other non-volatile memory.

Computing module 500 might also include a communications interface 520. Communications interface 520 might be used to allow software and data to be transferred between computing module 500 and external devices. Examples of communications interface 520 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 520 might typically be carried on signals, which can be electronic, electromagnetic (which includes optical) or other signals capable of being exchanged by a given communications interface 520. These signals might be provided to communications interface 520 via a channel 525. This channel 525 might carry signals and might be implemented using a wired or wireless communication medium. Some examples of a channel might include a phone line, a cellular link, an RF link, an optical link, a network interface, a local or wide area network, and other wired or wireless communications channels.

Computing module 500 might also include one or more user inputs 530. The user input allows for the user to enter commands to the computing module 500 and interact with it. Examples of user inputs might include a computer mouse, a keyboard, a touch-sensitive screen, a stylus, a mousepad, a joystick, an accelerometer, a gyroscope, a camera, a remote control, or any other user input mechanism. These user inputs may be used to interact with the disclosed interface.

The computer module 500 might also include one or more user output interfaces 540. The user output interfaces 540 might be used to interact with the user by presenting information or sensory outputs for the user. Examples of user output interfaces might include visual outputs, such as a display screen or monitor, or audio outputs, such as a speaker or headphone output.

In this document, the terms "computer readable medium" and "computer usable medium" are used to generally refer to media such as, for example, memory 508, storage unit 510, and channel 525. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure.

The invention claimed is:

1. A method, comprising:
presenting a video playback interface comprising:
   a primary viewing area on which an original video content is played;
   a timeline to indicate progress of video playback via the positioning of a playback scrubber; and
   a clip icon to activate a clip interaction mode;
receiving first data generated by a user actuating the clip icon;
in response to receiving the first data, activating a clip interaction mode by replacing the video playback interface with a video clip interface for a user to create a video clip from the original video content, wherein replacing the video playback interface with the video clip interface comprises:
   replacing the playback scrubber with a first clip scrubber and a second clip scrubber, wherein the first and second clip scrubbers are selectable by a user; and
   automatically defining an initial selected clip region by placing the first clip scrubber at a first initial point on the timeline and the second clip scrubber at a second initial point on the timeline, wherein the initial selected clip region is defined as the area on the timeline between the first initial point and the second initial point, wherein the first initial point is set to a location of the playback scrubber prior to activating the clip interaction mode, and wherein the second initial point is set to a pre-determined location on the timeline beyond the first initial point, wherein the pre-determined location is determined using the first initial point and one of a minimum clip length and a maximum clip length, wherein the maximum clip length is less than a total length of the original video content;

receiving a start point from the user in response to the user modifying or confirming the first initial point of the first clip scrubber;

receiving an end point for the second clip scrubber from the user in response to the user modifying or confirming the second initial point of the second clip scrubber;

using the first and second clip scrubbers to define a first video clip that is a portion of the original video content spanning the area of the timeline between the start point and the end point;

presenting a first clip window that shows an image corresponding to the start point of the first video clip;

presenting at least part of a second clip window that shows an image corresponding to the end point of the first video clip;

receive second data generated by the user actuating a save control for saving the first video clip defined using the first and second clip scrubbers;

in response to receiving the second data, saving the first video clip for later playback by the user, wherein the first video clip is saved to a collection of saved video clips of one or more original video contents, and wherein each of the saved video clips in the collection is a portion of a corresponding one of the one or more original video contents;

providing a user interface for displaying user-selectable thumbnail images of the collection of saved video clips, including the saved first video clip, and allowing the user to select one of the saved video clips to play by selecting a thumbnail; and in response to the user selecting an icon associated with one of the user-selectable thumbnail images, splitting the one user-selectable thumbnail image into two user-selectable options, wherein a first of the user-selectable options allows the user to rename a selected clip associated with the one user-selectable thumbnail image, wherein a second of the user-selectable options allows the user to remove the selected clip associated with the one user-selectable thumbnail image.

2. The method of claim 1, further comprising:
receiving a command to remove a video clip from the original video content, and
playing the original video content with one or more video clips removed from the original video content.

3. The method of claim 1, further comprising:
playing the original video content; and
presenting a bookmark during playing of the original video content, the bookmark corresponding to the saved first video clip.

4. The method of claim 3, wherein the video clip interaction option is presented when playing of the original video content approaches the bookmark.

5. The method of claim 4, wherein the video clip interaction option is a looping option, and the method further comprises:

receiving a command to loop the saved first video clip via the video clip interaction option; and
playing the saved first video clip on a repeating loop.

6. The method of claim 1, further comprising sorting the collection of video clips according to a pre-determined criteria.

7. The method of claim 6, further comprising receiving an information tag from the user to create a pre-determined criteria on which the collection of video clips may be sorted.

8. The method of claim 1, wherein the collection of saved video clips is associated with a particular set of user credentials.

9. The method of claim 1, wherein receiving a start point and an end point from the user further comprises providing assistance to the user in selecting a start point and an end point.

10. The method of claim 9, wherein providing assistance to the user in selecting a start point and an end point is based on one or more quality factors to determine a fitness of a particular frame to act as a start point or an end point.

11. The method of claim 10, further comprising receiving a user command indicating which of the one or more quality factors are to be considered in providing assistance to the user in selecting a start point and an end point.

12. The method of claim 10, wherein at least one of the one or more quality factors is based on at least one of the following: dialogue, image quality, frame audio content, and/or frame image content.

13. The method of claim 10, wherein a portion of the video content cannot be selected as a start point or an end point.

14. A method comprising:
receiving video clip information identifying one or more previously saved video clips of an original video content, wherein each of the one or more previously saved video clips was created from the original video content;
presenting a video player interface comprising:
a primary viewing area in which the original video content is played;
one or more video clip indicators which are associated with the one or more previously saved video clips and provide a visual indication of the position of the one or more previously saved video clips within the original video content; and
a video progress indicator which provides a visual indication of the progress of the original video content as it is played, and wherein the one or more video clip indicators are positioned along the video progress indicator so as to provide a visual indication of the position of the one or more previously saved video clips within the original video content;
defining an initial selected clip region in the video player interface by placing a first video clip indicator of the one or more video clip indicators at a first initial point on the video progress indicator and a second video clip indicator of the one or more video clip indicators at a second initial point on the video progress indicator, wherein the initial selected clip region is defined as a portion of the video progress indicator between the first initial point and the second initial point, wherein the first initial point is set to a location of the video progress indicator, and wherein the second initial point is set to a pre-determined location on video progress indicator beyond the first video clip indicator, wherein the pre-determined location is determined using the first initial point and one of a minimum clip length and a maximum clip length, wherein the maximum clip length is less than a total length of the original video content;

displaying a video clip looping option when the progress of the original video content approaches any of the one or more video clip indicators, wherein the video clip looping option, when selected, plays a previously saved video clip on a repeated loop, wherein the previously saved video clip is associated with a video clip indicator that caused display of the video clip looping option, and wherein the video clip looping option, after being selected, displays a stop looping icon by transforming the video clip looping option into the stop looping icon;

causing the video clip looping option to disappear when the video progress indicator has moved past any of the one or more video clip indicators; and in response to the user selecting an icon associated with a user-selectable thumbnail image, splitting the user-selectable thumbnail image into two user-selectable options, wherein a first of the user-selectable options allows the user to rename a selected clip associated with the user-selectable thumbnail image, wherein a second of the user-selectable options allows the user to remove the selected clip associated with the user-selectable thumbnail image.

15. The method of claim 14, further comprising:

receiving user input selecting the looping option; and playing, on a repeating loop, the previously saved video clip associated with the video clip indicator which caused display of the video clip interaction option.

16. The method of claim 14, further comprising displaying user-selectable thumbnail images of a collection of saved video clips created from the one or more previously saved video clips, wherein the collection of saved video clips is associated with a particular set of user credentials.

17. The method of claim 14, wherein receiving video clip information identifying one or more previously saved video clips within the original video content comprises receiving one or more video clip suggestions.

18. The method of claim 17, wherein the one or more video clip suggestions are based on video clips selected by other users.

19. A non-transitory computer readable medium comprising an instruction set configured to cause a computing device to perform:

presenting a video playback interface comprising:
 a primary viewing area on which an original video content is played;
 a timeline to indicate progress of video playback via the positioning of a playback scrubber; and
 a clip icon to activate a clip interaction mode;

receiving first data generated by a user actuating the clip icon;

in response to receiving the first data, activating a clip interaction mode by replacing the video playback interface with a video clip interface for a user to create a video clip from the original video content, wherein replacing the video playback interface with the video clip interface comprises:
 replacing the playback scrubber with a first clip scrubber and a second clip scrubber, wherein the first and second clip scrubbers are selectable by a user; and
 defining an initial selected clip region by placing the first clip scrubber at a first initial point on the timeline and the second clip scrubber at a second initial point on the timeline, wherein the initial selected clip region is defined as the area on the timeline between the first initial point and the second initial point, and wherein the second initial point is set to a pre-determined location on the timeline beyond the first initial point, wherein the pre-determined location is determined using the first initial point and one of a minimum clip length and a maximum clip length that is less than a total length of the original video;

receiving a start point from the user by the user providing input via the first clip scrubber;

receiving an end point from the user by the user providing input via the second clip scrubber;

using the start point, the end point, and the original video content to define a first video clip that is a portion of the original video content spanning the area of the timeline between the start point and the end point;

receive second data generated by the user actuating a save control for saving the first video clip defined using the start point and the end point received from the user;

in response to receiving the second data, saving the first video clip for later playback by the user, wherein the first video clip is saved to a collection of saved video clips of one or more original video contents, and wherein each of the saved video clips in the collection is a portion of a corresponding one of the one or more original video contents;

providing a user interface for displaying user-selectable thumbnail images of the collection of saved video clips, including the saved first video clip, and allowing the user to select one of the saved video clips to play by selecting a thumbnail; and in response to the user selecting an icon associated with one of the user-selectable thumbnail images, split the one user-selectable thumbnail image into two user-selectable options, wherein a first of the user-selectable options allows the user to rename a selected clip associated with the one user-selectable thumbnail image, wherein a second of the user-selectable options allows the user to remove the selected clip associated with the one user-selectable thumbnail image.

20. The non-transitory computer readable medium of claim 19 comprising an instruction set further configured to cause a computing device to perform:

playing the original video content; and presenting a bookmark during playing of the original video content, the bookmark corresponding to the saved first video clip.

21. The non-transitory computer readable medium of claim 19, wherein the instruction set is further configured to cause a computing device to perform:

receiving a command to remove a selected video clip from the original video content and playing the original video content with the selected video clip removed.

22. The non-transitory computer readable medium of claim 19 comprising an instruction set further configured to cause a computing device to perform presenting a video clip interaction option.

23. The non-transitory computer readable medium of claim 22, wherein the video clip interaction option is presented when playing of the original video content approaches the bookmark.

24. The non-transitory computer readable medium of claim 23, wherein the video clip interaction option is a looping option, and the instruction set is further configured to cause a computing device to perform receiving via the video clip interaction option a command to loop the saved first video clip; and playing the saved first video clip on a repeating loop.

25. The non-transitory computer readable medium of claim 19, wherein receiving the start point and the end point from the user further comprises providing assistance to the user in selecting the start point and the end point.

26. The non-transitory computer readable medium of claim 25, wherein providing assistance to the user in selecting the start point and the end point is based on one or more quality factors to determine a fitness of a particular frame to act as the start point or the end point.

27. The non-transitory computer readable medium of claim 26, wherein the instruction set is further configured to cause a computing device to perform receiving a user command indicating which of the one or more quality factors are to be considered in providing assistance to the user in selecting the start point and the end point.

28. The non-transitory computer readable medium of claim 26, wherein at least one of the one or more quality factors is based on at least one of the following: dialogue, image quality, frame audio content, and/or frame image content.

29. The non-transitory computer readable medium of claim 26, wherein a portion of the video content cannot be selected as the start point or the end point.

30. A non-transitory computer readable medium comprising an instruction set configured to cause a computing device to perform:
  receiving video clip information identifying one or more previously saved video clips of an original video content, wherein each of the one or more previously saved video clips was created from the original video content; and
  presenting a video player interface comprising:
    a primary viewing area in which the original video content is played,
    one or more video clip indicators which are associated with the one or more previously saved video clips and provide a visual indication of the position of the one or more previously saved video clips within the original video content, and
    a video progress indicator which provides a visual indication of the progress of the original video content as it is played,
    wherein the one or more video clip indicators are positioned along the video progress indicator so as to provide a visual indication of the position of the one or more previously saved video clips within the original video content;
  displaying a video clip looping option when the progress of the original video content approaches any of the one or more video clip indicators, wherein the video clip looping option, when selected, plays a previously saved video clip on a repeated loop, wherein the previously saved video clip is associated with a video clip indicator that caused display of the video clip looping option; and wherein the video clip looping option, after being selected, displays a stop looping icon;
  causing the video clip looping option to disappear by fading from view after a pre-determined period of time; and
  in response to the user selecting an icon associated with a user-selectable thumbnail image, splitting the user-selectable thumbnail image into two user-selectable options, wherein a first of the user-selectable options allows the user to rename a selected one of the previously saved video clips that is associated with the user-selectable thumbnail image, wherein a second of the user-selectable options allows the user to remove the selected one of the previously saved video clips that is associated with the user-selectable thumbnail image.

31. The non-transitory computer readable medium of claim 30, wherein the instruction set is further configured to cause a computing device to perform:
  receiving user input selecting the looping option; and
  playing, on a repeating loop, the previously saved video clip associated with the video clip indicator which caused display of the video clip interaction option.

32. The non-transitory computer readable medium of claim 30, wherein receiving video clip information identifying one or more previously saved video clips within the original video content comprises receiving one or more video clip suggestions.

33. The non-transitory computer readable medium of claim 32, wherein the one or more video clip suggestions are based on video clips selected by other users.

34. The method of claim 19, wherein receiving the start point from the user by the user providing input via the first clip scrubber and receiving the end point from the user by the user providing input via the second clip scrubber comprises: receiving third data generated by the user by moving the first clip scrubber to the start point and the second clip scrubber to the end point.

35. The method of claim 34, further comprising in response to receiving the third data:
  displaying a first clip window showing an image frame corresponding to the original video content at the start point; and
  displaying a second clip window showing an image frame corresponding to the original video content at the end point.

36. The method of 14, wherein each of the one or more video clip indicators are bookmarks positioned along the video progress indicator.

* * * * *